Oct. 31, 1933.　　　J. H. GLATTLY　　　1,933,053

ELECTRIC OUTLET BRACKET

Filed May 10, 1932　　　2 Sheets-Sheet 1

WITNESS:

INVENTOR

John H. Glattly
BY
Augustus B. Stoughton
ATTORNEYS.

Oct. 31, 1933.   J. H. GLATTLY   1,933,053
ELECTRIC OUTLET BRACKET
Filed May 10, 1932   2 Sheets-Sheet 2
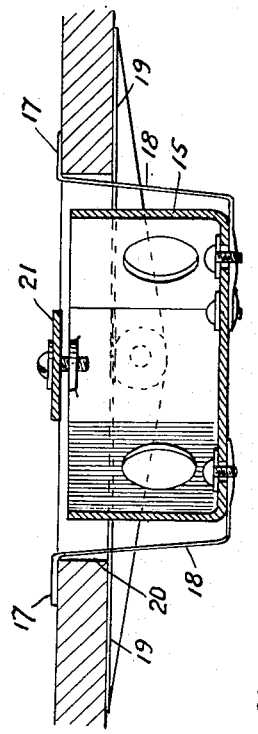
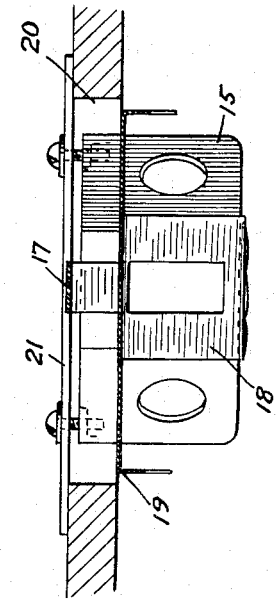
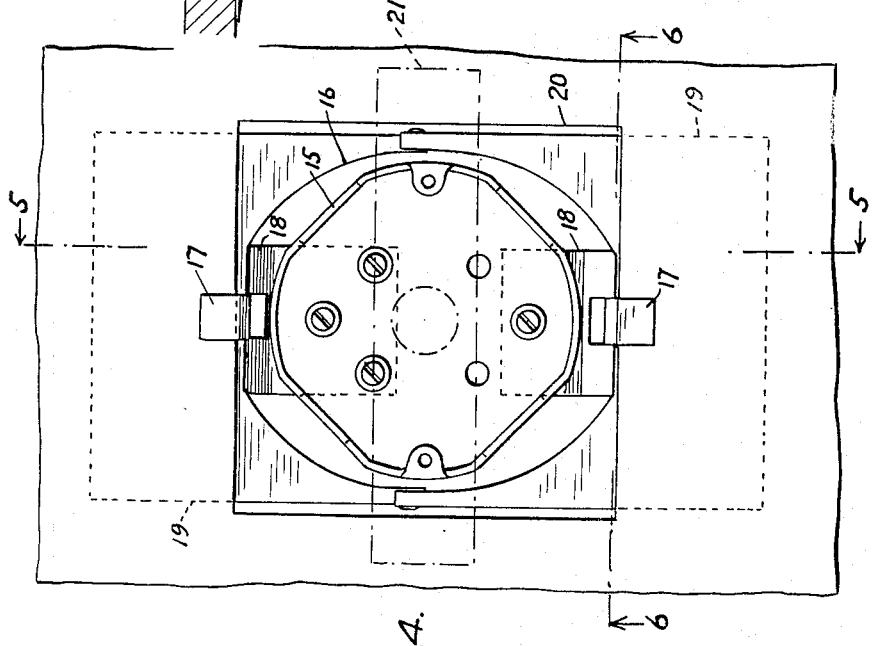
INVENTOR
John H. Glattly
BY
Augustus B. Stoughton
ATTORNEY.

Patented Oct. 31, 1933

1,933,053

UNITED STATES PATENT OFFICE 1,933,053

ELECTRIC OUTLET BRACKET

John H. Glattly, Clifton, N. J.

Application May 10, 1932. Serial No. 610,398

4 Claims. (Cl. 247—21)

In the installation of apparatus for supplying electricity, switch boxes and like fittings have to be applied to walls and to panels of various kinds, including glass, highly finished woodwork, marble and the like, and the application must be made as well to ceilings as to walls, and the location of the switch boxes and like fittings is not always known in advance.

The principal object of the present invention is to provide an electric outlet bracket of simple and comparatively inexpensive construction which can be readily mounted in a hole provided in a wall, ceiling or other structure of the character referred to and which, when mounted, affords a firm, strong and immovable support for an outlet box or other fitting including, if desired, a suspended lighting or other fixture. Another object of the invention is to provide for the application of the bracket to walls or supports of practically any character by making the brackets of slightly different and appropriate dimensions.

Generally stated, the invention comprises a generally oblong hollow frame defining an opening and having lips extending outward from the opening and spaced from the surface of the frame and having hinged connections aligned with the opening, the lips serving with the frame to secure the bracket to the end parts of an opening in a wall, ceiling or like structure, so that a switch box or the like can be attached to the bracket and by it be firmly supported, and the hinge connections serving to permit of the insertion of the bracket through the hole in the wall and its positioning in the described manner.

The invention also comprises the improvements to be presently described and finally claimed.

In the following description reference will be made to the accompanying drawings forming part hereof and in which Figure 1 is a perspective view of a bracket embodying features of the invention and showing the hinged connection thereof slightly bent or broken.

Fig. 4 is a bottom plan looking at the ceiling and showing a bracket embodying features of the invention in application thereto, there being also shown in dash and dot lines a bar from which a lighting fixture may be suspended.

Fig. 5 is a section on the line 5—5 of Fig. 4, and

Fig. 6 is a transverse section on the line 6—6 of Fig. 4.

Figure 1:
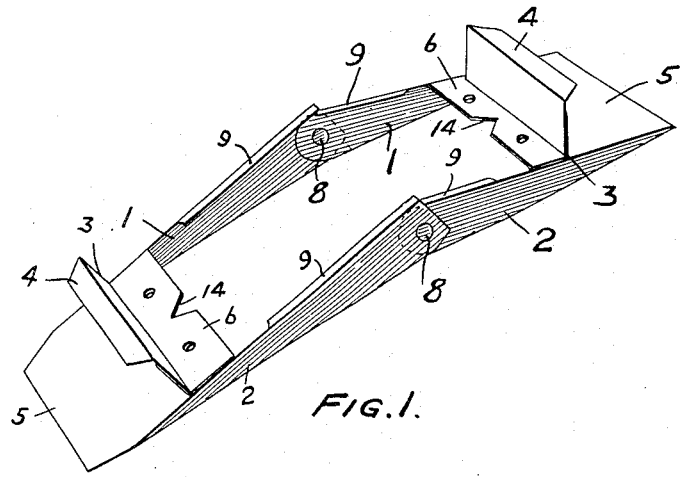

In the drawings, particularly Fig. 1, there are duplicate frame parts and one of them will be described. Each frame part comprises spaced arms 1 and 2, and a cross member 3 at one end of the arms. There is a lip 4 spaced from and disposed intermediate of the edges of the cross piece 3. Cross piece 3 provides a surface 5 adapted to cooperate with the lip 4 and an ear 6 to which the switch or outlet box 7 can be attached either directly or through the intervention of suitable attaching means. The end portions of the arms of the frame part are pivoted together as at 8 for movement in one direction only. This, where the bracket is made by stamping, can well be accomplished by providing the arms with flanges 9. There is provided an open space defined by the arms and cross pieces and it serves for the reception of the switch or outlet box 7. The spacing of the parts 4 and 5 depends upon the thickness and character of the wall to which the bracket is to be attached. The means for connecting the box to the bracket may be quite different in different cases and may or may not involve the ear 6, and the ear 6 may be arranged in various ways.

Figure 2:
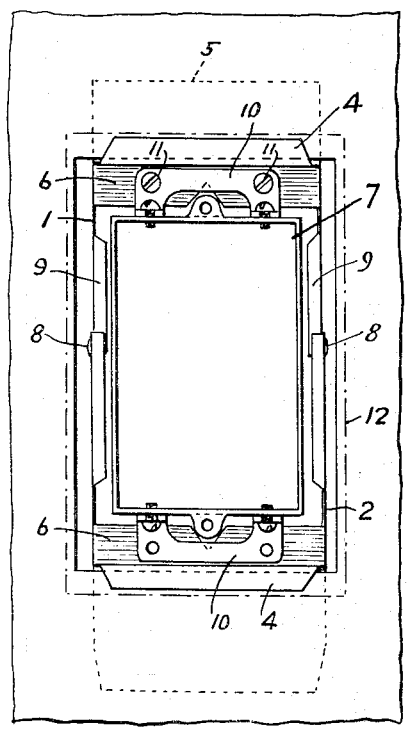
Fig. 2 is a front view illustrating a bracket of the invention mounted in a wall, panel or the like with an outlet box secured thereto.
Figure 3:
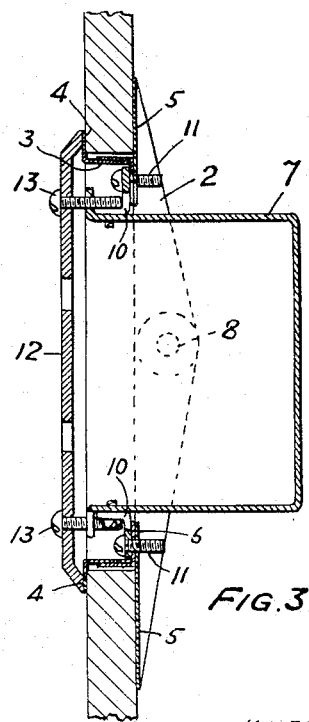
Fig. 3 is a transverse central section of Fig. 2.

Referring to Figs. 2 and 3, a hole is made in the wall, panel or like part and by bending the hinges 8 the bracket can be inserted into the hole with the hinges last. Then the hinges of the bracket are straightened out so that the lip 4 is on the front face of the wall and the part 5 of the frame is on the rear face of the wall and the bracket is firmly secured in place. The box 7 is then inserted in the opening in the bracket and is secured to the ear 6 thereof by clips 10 secured to the box and held to the ear 6 by screws 11.

The cover plate 12 is secured to the bracket in this instance by screws 13 which engage projections on the box 7 which in turn is secured to the bracket. As shown notches 14 are provided for the accommodation of the screws 13 which are frequently rather longer than is indicated in the drawings.

To illustrate another embodiment of the invention reference may be made to Figs. 4, 5 and 6. The construction and mode of operation of the embodiment or modification shown in those figures are as above described except as follows:

The box or outlet 15 is of somewhat cylindrical contour and the opening 16 in the bracket conforms with it and may be generally circular or polygonal in outline. The lips 17 are struck and turned back from the ears 18 by which the box is secured to place on the bracket. The portions 19 of the bracket are substantially as has been described. The box 15 being securely held in the opening 20 provided for it in the ceiling, use may be made of a bar 21 indicated in dash and dot lines and also secured to the box as a means for suspending a depending fixture.

While reference has been made to the frame part with an opening for a single box, it is evident that two such openings can be provided and in that case two boxes can be attached to a single bracket.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. An electric outlet bracket comprising two interconnected frame parts each comprising two spaced arms, a cross member connected to the arms, and a lip spaced from and disposed intermediate of the edges of the cross member, the end portion of each of the arms of one frame part being pivoted to the end portion of the corresponding arm of the other frame part for turning movement in one direction only and providing an open space defined by the arms and cross members.

2. An electric outlet bracket comprising two interconnected frame parts each including two spaced arms, a cross member connected to the arms, and a lip spaced from the cross member, the end portion of each of the arms of one frame part being pivoted to the end portion of the corresponding arm of the other frame part for turning movement in one direction only and providing an open space defined by the arms and cross members.

3. An electric outlet bracket comprising two interconnected frame parts each including two spaced arms, a cross member connected to the arms, a lip spaced from the cross member, and an ear disposed opposite said lip, the end portion of each of the arms of one frame part being pivoted to the end portion of the corresponding arm of the other frame part for turning movement in one direction only and providing an open space defined by the arms and cross members.

4. An electric outlet bracket comprising two interconnected frame parts each comprising two spaced arms, a cross member connected to the arms, and a lip spaced from and disposed intermeidate of the edges of the cross member, the end portion of each of the arms of one frame part being pivoted to the end portion of the corresponding arm of the other frame part and providing an open space defined by the arms and cross members.

JOHN H. GLATTLY.